US006834063B2

(12) United States Patent
Fukumoto

(10) Patent No.: US 6,834,063 B2
(45) Date of Patent: Dec. 21, 2004

(54) EFFICIENT ANGLE TUNABLE OUTPUT FROM A MONOLITHIC SERIAL KTA OPTICAL PARAMETRIC OSCILLATOR

(75) Inventor: Joseph M. Fukumoto, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 147 days.

(21) Appl. No.: 09/939,004

(22) Filed: Aug. 24, 2001

(65) Prior Publication Data

US 2002/0048077 A1 Apr. 25, 2002

Related U.S. Application Data

(63) Continuation-in-part of application No. 09/478,229, filed on Jan. 6, 2000, now Pat. No. 6,344,920.
(60) Provisional application No. 60/263,999, filed on Jan. 24, 2001.

(51) Int. Cl.[7] .................................................. H01S 3/10
(52) U.S. Cl. ......................................... 372/21; 372/22
(58) Field of Search ............................... 372/21–23, 25, 372/20, 11, 12, 75, 97, 106; 359/326–332

(56) References Cited

U.S. PATENT DOCUMENTS

| | | | | |
|---|---|---|---|---|
| 5,371,752 A | * | 12/1994 | Powers et al. | 372/25 |
| 5,400,173 A | * | 3/1995 | Komine | 359/330 |
| 5,754,333 A | * | 5/1998 | Fulbert et al. | 359/330 |
| 5,854,802 A | * | 12/1998 | Jin et al. | 372/22 |
| 5,940,418 A | * | 8/1999 | Shields | 372/22 |
| 6,023,479 A | * | 2/2000 | Thony et al. | 372/11 |
| 6,167,067 A | * | 12/2000 | Meyer et al. | 372/21 |
| 6,344,920 B1 | * | 2/2002 | Fukumoto | 359/330 |
| 6,400,495 B1 | * | 6/2002 | Zayhowski | 359/333 |

OTHER PUBLICATIONS

Arisholm, Gunnar, et al., "Optical parametric oscillator with non–ideal mirrors and single– and multi–mode pump beams", Optics Express, Mar. 1, 1999, vol. 4, No. 5, pp. 183–192, OSA.
Vaidyanathan, M., et al., "Cascaded optical parametric oscillations", Optics Express, Jul. 21, 1997, vol. 1, No. 2, pp. 49–53, OSA.

* cited by examiner

Primary Examiner—Minsun Oh Harvey
Assistant Examiner—Tuan N. Nguyen
(74) Attorney, Agent, or Firm—John E. Gunther; Leonard A. Alkov; William C. Schubert

(57) ABSTRACT

An arrangement (10) for efficiently shifting energy received at a first wavelength and outputting the shifted energy at a second wavelength. The arrangement (10) includes a laser (12) and an optical parametric oscillator (14) of unique design. The oscillator (14) is constructed with an energy shifting crystal (20) and first and second reflective elements (16) and (18) disposed on either side thereof. Light from the laser (12) at a fundamental frequency is shifted by the crystal and output at a second wavelength. The second wavelength is a secondary emission of energy induced by a primary emission generated by the first wavelength in the crystal. A novel feature of the invention is a coating applied on the reflective elements (16 and/or 18) for containing the primary emission and enhancing the secondary emission. This constrains the energy to be output by the arrangement (10) at the wavelength of the desired secondary emission.

9 Claims, 4 Drawing Sheets

"EYE-SAFE" PRIMARY | SECONDARY 1.064 μM → [X-CUT KTA] —1.53 μM / 3.47 μM→ [X-CUT KTA] —2.59 μM / 3.76 μM→  REMOTE CHEMICAL SENSING

BIOLOGICAL AGENT, IRCM 20, 20

FIG. 8

1.064 → [Y-CUT KTA] —1.50 / 3.65→ [Y-CUT KTA] —2.42 / 3.95→

30, 30

FIG. 9a 1.064 → [X-CUT RTA] —1.61 / 3.15→ [X-CUT RTA] —3.01 / 3.45→

40, 40

FIG. 9b 1.064 → [Y-CUT RTA] —1.54 / 3.42→ [Y-CUT RTA] —2.64 / 3.73→

EFFICIENT ANGLE TUNABLE OUTPUT FROM A MONOLITHIC SERIAL KTA OPTICAL PARAMETRIC OSCILLATOR

CROSS-REFERENCE TO RELATED APPLICATIONS

This application is a continuation-in-part of U.S. patent application Ser. No. 09/478,229, entitled MONOLITHIC SERIAL OPTICAL PARAMETRIC OSCILLATOR, filed Jan. 6, 2000, now U.S. Pat. No. 6,344,920, and claims the benefit of U.S. Provisional Application No. 60/263,999, filed Jan. 24, 2001, the disclosure of which is hereby incorporated by reference.

BACKGROUND OF THE INVENTION

1. Field of the Invention

The present invention relates to solid state lasers and frequency shifting of laser output. More specifically, the present invention relates to systems and method for frequency shifting solid state laser output into the 2.5–3.0 micron range.

2. Description of the Related Art

Lasers are currently widely used for communication, research and development, manufacturing, directed energy and numerous other applications. For many applications, the energy efficiency, power and lightweight of solid state lasers makes these devices particularly useful. Because only a few crystals lase and each crystal lases at a unique fundamental frequency, the wavelengths which can be generated by a laser are limited.

Efficient generation of pulsed tunable laser output in the 2.5–3.0 micron region has been particularly difficult to achieve. Direct laser sources in this region are inefficient and lack true continuous tunability. A system which can generate strong coherent output at these wavelengths would be useful for many potential applications such as remote chemical sensing, biological agent detection, and infrared countermeasures. It could also be used as a pump source for generating lasers at longer wavelengths.

Furthermore, it would be useful if such a system was continuously tunable. A problem associated with the use of lasers at these wavelengths has been the tendency of the moisture in the atmosphere to absorb energy at certain wavelengths in this region, making it difficult to propagate energy over long distances. A series of water absorption bands exist in the 2.5–3.0 micron region which are very sharp and narrow. A continuously tunable laser could be used to alleviate this problem by allowing one to move the output wavelength to one side or the other of a particular water absorption spike.

Hence, there is a need in the art for a system or method for efficient generation of pulsed tunable laser output in the 2.5–3.0 micron region.

SUMMARY OF THE INVENTION

The need in the art is addressed by the system and method of the present invention. In a most general sense, the invention is an arrangement comprising a mechanism for shifting energy received at a first wavelength and outputting the shifted energy at a second wavelength. The second wavelength is a secondary emission of energy induced by a primary emission generated from the first wavelength in the shifting medium. Hence, a novel feature of the invention is the inclusion of a second mechanism, in functional alignment with the first mechanism, for containing the primary emission and enhancing the secondary emission. This constrains the energy to be output by the arrangement at the desired wavelength.

In addition, the first mechanism is angle tunable, such that the output wavelength can be continuously tuned by varying the angle of the incoming energy at the first wavelength relative to the first mechanism.

In the illustrative embodiment, the first mechanism is an optical parametric oscillator having a crystal such as potassium titanyl arsenate. The crystal may be X-cut, Y-cut, etc. The second mechanism then includes first and second reflective elements. The first and second reflective elements have high reflectivity at a wavelength of the primary emission. The first reflective element also has high reflectivity at the second wavelength of the secondary emission, and the second reflective element is at least partially transmissive at the second wavelength of the secondary emission.

In one embodiment illustrated herein, the first wavelength is approximately 1.06 microns, the second wavelength is approximately 2.59 microns and the primary emission includes energy at 1.53 microns.

Thus, the present invention provides a novel system and method for generating tunable pulsed laser output at 2.59 microns by converting the output of a standard 1 micron laser using a tunable monolithic serial optical parametric oscillator.

BRIEF DESCRIPTION OF THE DRAWINGS

FIG. 8 is a simplified diagram that illustrates an application of an optical parametric oscillator constructed in accordance with the present teachings.

FIGS. 9a–c depict a few additional alternative implementations of OPOs made possible by the teachings of the present invention.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention provides a novel system and method for generating tunable pulsed laser output at 2.59 microns by converting the output of a standard 1 micron laser using a tunable monolithic serial optical parametric oscillator (OPO).

Figure 1:
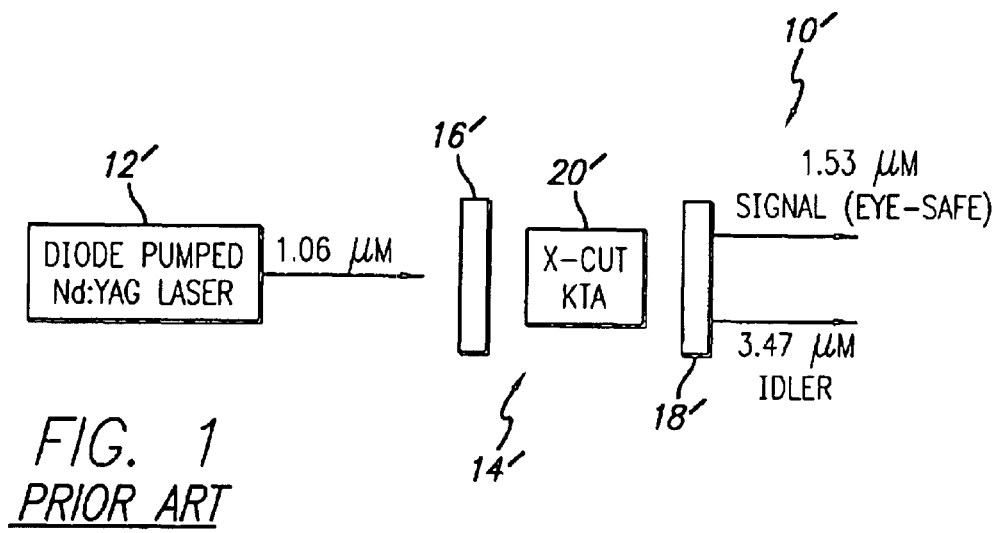
FIG. 1 is a diagram depicting a laser-based system for generating eye-safe wavelengths in accordance with conventional teachings.

FIG. 1 is a diagram depicting a commonly used laser-based system for generating eye-safe wavelengths in accordance with conventional teachings. The system 10' includes a laser, such as a diode pumped Neodymium-Ytterbium Aluminum Garnet (Nd:YAG) laser 12', which outputs a collimated beam of electromagnetic energy at a fundamental frequency of 1.06 $\mu$m. This 1.06 $\mu$m beam is applied to an optical parametric oscillator (OPO) 14' consisting of a crystal nonlinear medium 20' sandwiched between a rear high reflector 16' and an output coupler 18'. Eye-safe wavelength generation in the OPO 14' typically uses Type II non-critically phase matched, x-cut potassium titanyl arsenate (KTA) as the non-linear medium. Although the crystal 20' is a Type II non-critically phase matched, x-cut KTA in the illustration, those skilled in the art will appreciate that the secondary effect discussed below is not limited thereto.

As is known in the art, in response to the application of a 1.06 $\mu$m pump beam thereto, the crystal 20' generates an eye-safe 1.53 $\mu$m signal wave and 3.47 $\mu$m idler wave. This is known as the 'primary process'.

However, not generally known in the art is the fact that as a result of this primary process, which is a serial process, a 'secondary process' occurs and is due to the feedback of the 1.53 $\mu$m wave into the crystal by the reflectors 16' and 18' at the x-cut angle, an angle along one of the primary axes of the crystal. (KTA and other crystals used for OPOs are 'angle tunable'. That is, the angle of the input beam relative to the crystal's axes determines the wavelength of the output beam.) The secondary OPO process produces distinct signal and idler waves that are of longer wavelengths than those of the first OPO process. This is due to the fact that even a small amount of reflectivity (i.e., <10%) from either the crystal anti-reflection coatings or the OPO mirrors at the secondary OPO signal wavelength can initiate oscillations at the secondary signal wavelength due to high gain and large acceptance angles of the secondary process. The crystal responds by generating the secondary signal and idler waves.

Figure 2:
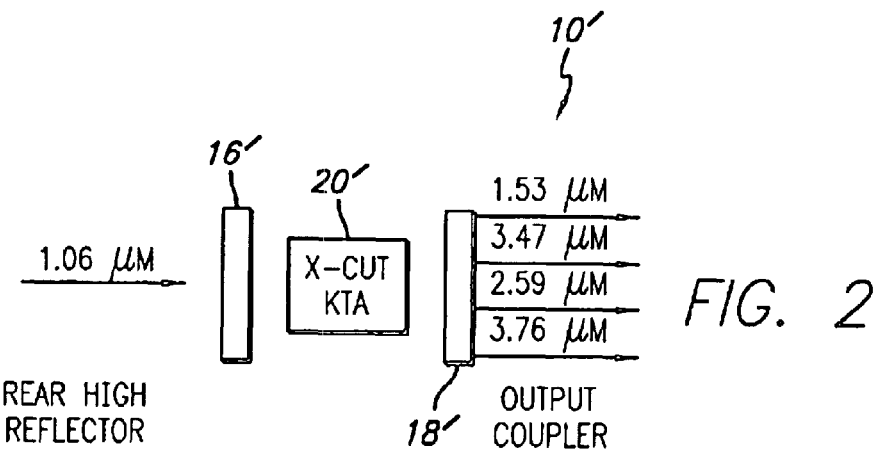
FIG. 2 is an illustration depicting the secondary process caused by the primary process depicted in FIG. 1.

In the illustration of FIG. 1, for example, the secondary process can transform some fraction of the eye-safe (1.53 $\mu$m) signal wave of the primary OPO process into secondary signal and idler waves at 2.59 $\mu$m and 3.76 $\mu$m, respectively. This is shown in the simplified diagram of FIG. 2, which depicts the newly discovered secondary process caused by the primary process depicted in FIG. 1.

As described more fully in the above-identified patent (U.S. Pat. No. 6,344,920) the secondary OPO process can be minimized and the first process optimized to produce greater energy conversion efficiency to either the eye-safe signal or idler wavelengths in the first process.

If, however, the secondary waves are of interest, the primary signal wave can be resonated in the OPO cavity by conscientious design of OPO mirror coatings, resulting in an intracavity-pumped secondary OPO process. Furthermore, theory predicts that the secondary process can occur in all isomorphs of KTA (e.g., KTP, RTA, and CTA), and that it can be angle tuned to provide continuous tunability for all four waves of the primary and secondary processes.

The present teachings allow one to generate robust, tunable output at the wavelengths of the secondary process by maximizing the secondary OPO process (at the expense of the signal wave of the first process) through conscientious design of OPO mirror coatings.

A novel scheme is disclosed herein whereby the secondary serial OPO process is phase matched, provides significant gain, and uses the eye-safe signal wave as a pump for a second OPO process in the same crystal. A novel monolithic serial OPO design is disclosed which can be used to efficiently generate tunable output at the wavelengths of the secondary process with a single input pump wavelength in a single non-linear crystal such as non-critically phase matched, x-cut potassium titanyl arsenate.

The present teachings are appreciated with reference to FIGS. 3–9.

Figure 3:
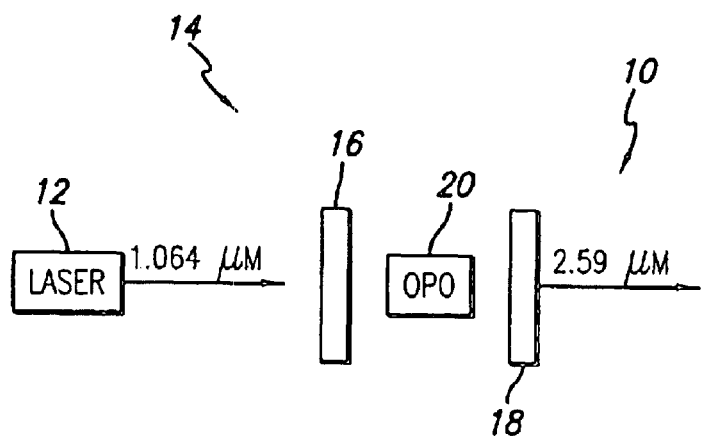
FIG. 3 is a diagram of an arrangement constructed in accordance with the teachings of the present invention.

FIG. 3 is a diagram of an arrangement implemented in accordance with the present teachings. As per the conventional implementation of FIG. 1, the system 10 of FIG. 3 includes a laser 12 and an OPO 14. The OPO 14 includes a frequency shifting medium such as a crystal 20 sandwiched between a rear reflector 16 and an output coupler 18. The system 10 is similar to the system 10' of FIG. 1 with the exception that the rear reflector 16 and the output coupler 18 are designed to maximize the generation of secondary waves at 2.59 $\mu$m.

Figure 4:
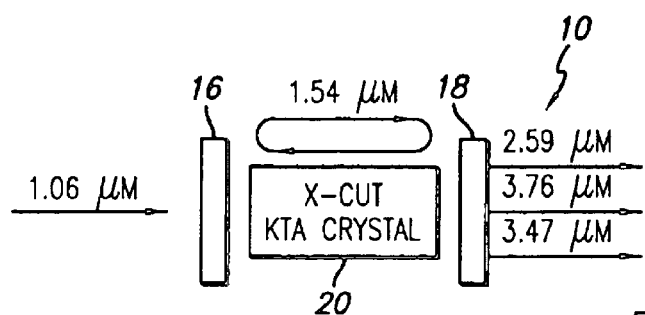
FIG. 4 is an illustration showing containment of the first process signal wave.

FIG. 4 illustrates that the first process signal wave can be fully contained by the OPO 14 by specifying high reflectivity at the first signal wavelength for both the rear reflector 16 and output coupler 18 and providing full reflectivity for 2.59 $\mu$m for the rear reflector and partial reflectivity at 2.59 $\mu$m for the output coupler 18. In this manner, the 1.54 $\mu$m pump wave for the secondary process is fully contained while the 2.59 $\mu$m signal wave for the secondary process is allowed to oscillate. (See FIG. 4.)

Because the more typical mirror substrates such as BK7 and fused silica may absorb some of the 2.59 $\mu$m and 3.76 $\mu$m beams, use of OPO mirrors fabricated from $CaF_2$ or ZnSe will allow clear transmission of the secondary process waves for diagnostic purposes. (The two waves may be isolated and detected with a spectrometer and detector. Because of bulk absorption losses in the crystal at 3.76 $\mu$m, it may be more difficult to resonate the secondary process at 3.76 $\mu$m.)

In an illustrative embodiment, the rear OPO mirror 16 is a 20 m radius $CaF_2$ substrate, with a 1.5 $\mu$m and 2.6 $\mu$m high-reflective coating that transmits 84% at 1.064 $\mu$m. The output coupler 18 is a $CaF_2$ flat, with a 46% reflectivity at 2.6 $\mu$m, and greater than 99% reflectivity at 1.5 $\mu$m coating. The combined round-trip reflectivities of the OPO mirrors at 3.5 $\mu$m and 3.8 $\mu$m are 0.2% and 0.1%, respectively.

Figure 5A:
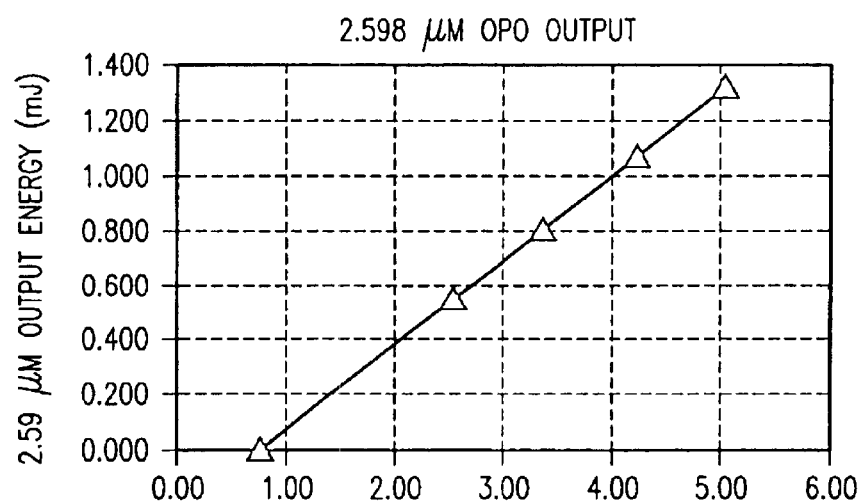
FIGS. 5a and 5b are graphs summarizing the results from conversion efficiency measurements of the secondary signal wave.
Figure 5B:
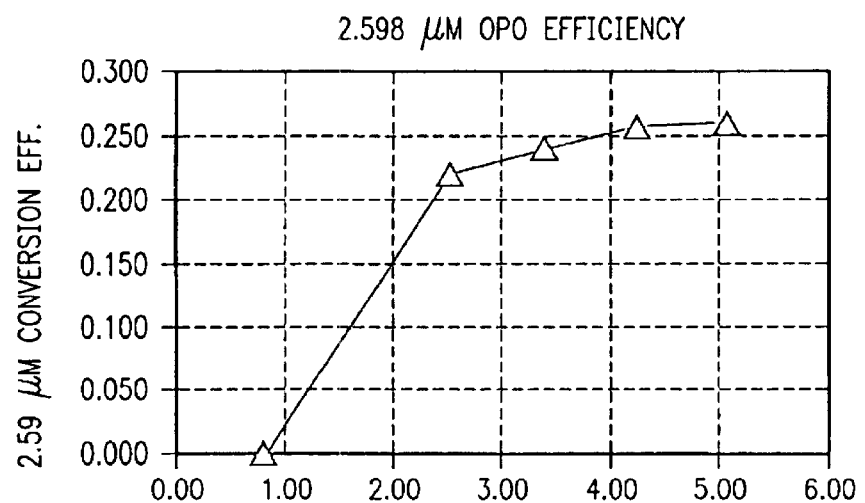

FIGS. 5a and 5b summarize the results from conversion efficiency measurements of the secondary signal wave. The threshold for the secondary process occurred at an incident pulse energy of 0.8 mJ (0.23 J/cm2), and at the highest pulse energies used for these experiments (corresponding to a fluence of 1.5 J/cm2), over 25% energy conversion for the 1.064 $\mu$m→2.598 $\mu$m process was observed. This energy conversion efficiency corresponds to a 61% overall photon conversion efficiency, which is significant for a non-optimized, two stage serial conversion process.

In the preferred embodiment, the reflector 16 and coupler 18 are optical thin films disposed on a substrate to provide a mirrored surface. Those skilled in the art will appreciate that any suitable thin film design may be used for this purpose.

Figure 6:
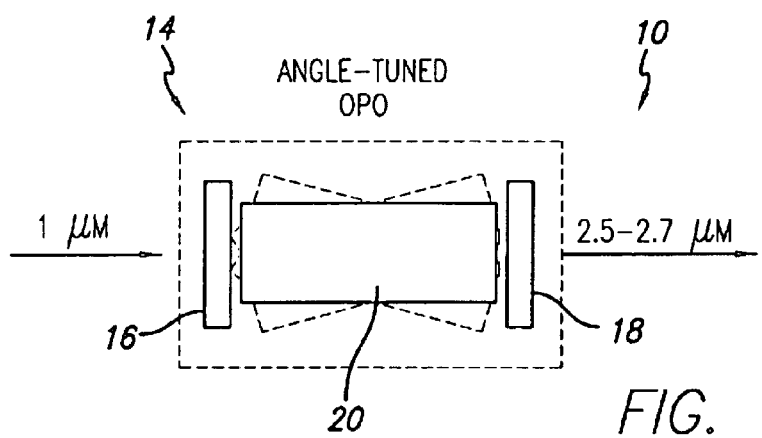
FIG. 6 is an illustration showing angle tunability of the system in FIG. 3.

FIG. 6 illustrates that the system 10 in FIG. 3 is angle tunable. That is, a tilting of the crystal at varying angles relative to the 1.064 $\mu$m pump beam results in a corresponding change in the wavelength of the output beam. Hence, the OPO may be tuned continuously by tilting the crystal.

Figure 7A:
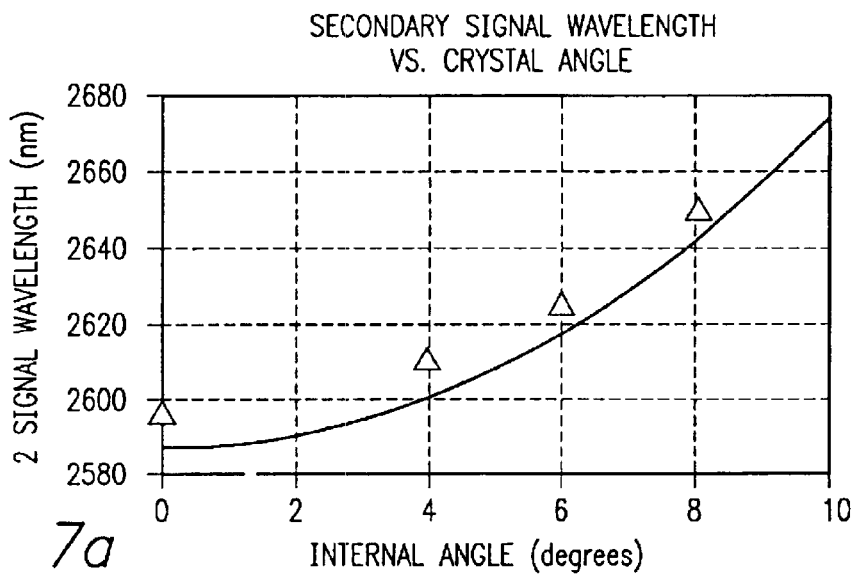
FIGS. 7a and 7b are graphs showing the angle tuning behavior of the secondary signal and idler waves, respectively.
Figure 7B:
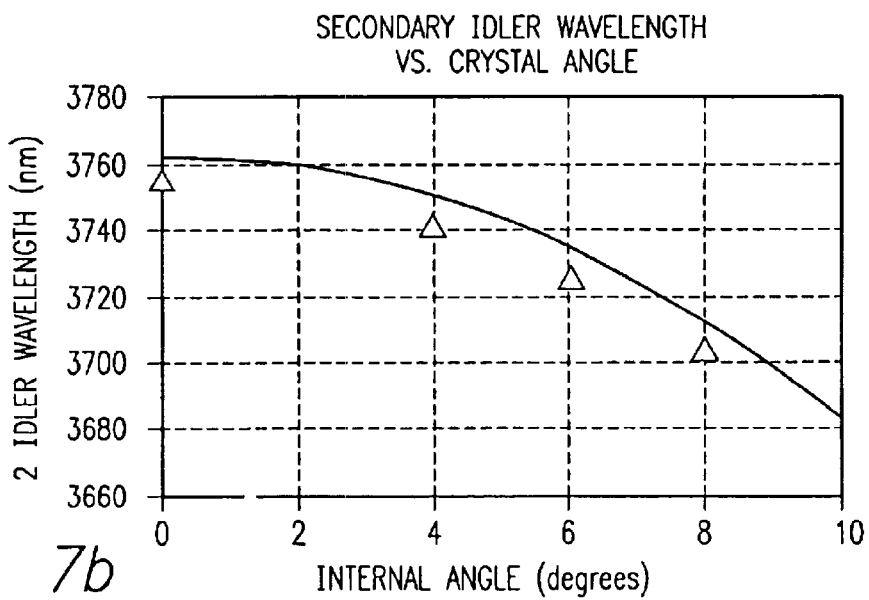

The secondary signal and idler wave angle tuning behavior is plotted in FIGS. 7a and 7b, respectively. The measured data and predictions differ by approximately 5–10 nm throughout the angular range studied. However, the general tuning behavior of the secondary waves is predictable and would closely match the predictions with the addition of a constant offset. With this new experimental data, the secondary signal and idler wave angle tuning behavior can be predicted more accurately.

FIG. 8 is a simplified diagram that illustrates an application of an optical parametric oscillator constructed in accordance with the present teachings. The laser 12 and the reflective elements 16 and 18 have been omitted for clarity.

In FIG. 8, note that only a single crystal 20 is used, not two separate crystals. Nonetheless, those skilled in the art will appreciate that the present teachings may be extended to any number of mediums or crystals arranged in serial (cascade) or parallel configurations or any combination thereof without departing from the scope of the present teachings.

As shown in FIG. 8, the secondary process may be optimized in the manner discussed above to output strong beams at 2.59 $\mu$m and/or 3.76 $\mu$m for numerous applications including remote chemical sensing, biological agent detection and/or infrared countermeasure (IRCM) applications utilizing the teachings of the present invention. In connection with the discussion above, the secondary process is maximized by encouraging oscillation of the secondary signal and/or idler waves by careful design of the OPO mirror and crystal coatings.

FIGS. 9a–c depict a few alternative implementations of OPOs possible with the teachings of the present invention. In FIG. 9a, the reflective surfaces 16 and 18 (not shown) are coated so that when a 1.064 $\mu$m fundamental beam is applied to a y-cut KTA crystal 30, a primary process occurs which generates a signal wave at 1.50 $\mu$m and an idler wave at 3.65 $\mu$m. The reflective elements 16 and 18 (not shown) are coated to contain the primary signal wave at 1.50 and pass beams at 2.42 and 3.95 $\mu$m due to a secondary emission therefrom.

FIG. 9b shows an arrangement designed to generate output beams at 3.01, 3.45 and 3.15 $\mu$m from an x-cut RTA crystal 40.

FIG. 9c shows an arrangement designed to generate output beams at 2.64, 3.73 and 3.42 $\mu$m from a y-cut RTA crystal 50. The non-linear crystal KTP will also generate secondary signal and idler wavelengths in a fashion similar to the above examples.

In each of the implementations of FIGS. 9a–c, the reflective elements 16 and 18 are coated to contain energy at the primary process signal wavelengths and emit energy at the wavelengths shown. Those skilled in the art will be able to design reflective elements using optical thin films or other techniques known in the art and the invention is not limited to the design thereof.

Thus, the present invention has been described herein with reference to a particular embodiment for a particular application. Those having ordinary skill in the art and access to the present teachings will recognize additional modifications, applications and embodiments within the scope thereof. For example, the present teachings are not limited to the use of optical thin film reflective elements. Any surface which serves to eliminate unwanted energy from the medium may be used for this purpose.

It is therefore intended by the appended claims to cover any and all such applications, modifications and embodiments within the scope of the present invention.

Accordingly,

What is claimed is:

1. An optical parametric oscillator comprising:

a crystal adapted to
receive pump energy at a first wavelength,
convert said pump energy to energy at both a primary signal wavelength and a primary idler wavelength by means of a primary process, and
convert said energy at a primary signal wavelength to energy at both a second signal wavelength and second idler wavelength by means of a cascaded secondary process; and a mechanism disposed in functional alignment with said crystal for containing said energy at a primary signal wavelength and enhancing said secondary process thereby, said mechanism including first and second mirrors, both of said mirrors being highly reflective at said primary signal wavelength, and at least one of said mirrors being at least partially transmissive to energy at said second signal wavelength.

2. The invention of claim 1 wherein said crystal is X cut.

3. The invention of claim 1 wherein said crystal is Y cut.

4. The invention of claim 1 wherein said crystal is potassium titanyl arsenate.

5. The invention of claim 1 wherein said first wavelength is approximately 1.06 microns, said second signal wavelength is approximately 2.59 microns and said primary signal wavelength is approximately 1.53 microns.

6. The invention of claim 1 wherein said first wavelength is approximately 1.06 microns, said second signal wavelength is approximately 3.76 microns and said primary signal wavelength is approximately 1.53 microns.

7. The invention of claim 1 wherein said crystal is angle tunable.

8. The invention of claim 1 wherein both of said first and second mirrors are highly transparent at said primary idler wavelength and said secondary idler wavelength.

9. The invention of claim 1 wherein one of said first and second mirrors is highly reflective at said second signal wavelength.

* * * * *